United States Patent [19]

Kim

[11] Patent Number: 5,982,860
[45] Date of Patent: Nov. 9, 1999

[54] FACSIMILE SYSTEM HAVING A PROXIMITY SENSOR FOR AUTOMATICALLY SWITCHING RECEPTION MODE BASED UPON PRESENCE OR ABSENCE OF AN OPERATOR WITHIN A PREDETERMINED PROXIMITY ZONE AND METHOD FOR CONTROLLING THE SAME

[75] Inventor: Man-Kyu Kim, Gumi, Rep. of Korea

[73] Assignee: SamSung Electronics Co., Ltd., Suwon, Rep. of Korea

[21] Appl. No.: 08/834,819

[22] Filed: Mar. 31, 1997

[30] Foreign Application Priority Data

Mar. 29, 1996 [KP] DPR of Korea ............... 1996-9220

[51] Int. Cl.[6] .................................................. H04M 11/00
[52] U.S. Cl. ........................ 379/100.15; 379/100.01; 379/93.09
[58] Field of Search .................. 379/93.01, 93.03, 379/93.04, 93.05, 93.06, 93.09, 93.11, 93.15, 93.17, 100.01, 100.02, 100.05, 100.06, 100.13, 100.15, 100.16, 100.17

[56] References Cited

U.S. PATENT DOCUMENTS

| | | |
|---|---|---|
| 4,648,126 | 3/1987 | Toffolo ................................ 455/212 |
| 4,868,865 | 9/1989 | Ogawa et al. . |
| 4,908,851 | 3/1990 | Kotani et al. . |
| 5,065,427 | 11/1991 | Godbole . |
| 5,086,455 | 2/1992 | Satomi et al. . |
| 5,131,026 | 7/1992 | Park . |
| 5,189,683 | 2/1993 | Nakajima . |
| 5,216,706 | 6/1993 | Nakajima . |
| 5,255,311 | 10/1993 | Yoshida . |
| 5,329,243 | 7/1994 | Tay ....................................... 330/136 |
| 5,333,179 | 7/1994 | Yamamoto et al. . |
| 5,428,673 | 6/1995 | Nakagawa et al. . |
| 5,448,378 | 9/1995 | Matsumoto . |
| 5,487,105 | 1/1996 | Sakai . |
| 5,508,824 | 4/1996 | Baba . |
| 5,712,911 | 1/1998 | Her ....................................... 379/418 |

FOREIGN PATENT DOCUMENTS

2302478  1/1997  United Kingdom .

*Primary Examiner*—Curtis A. Kuntz
*Assistant Examiner*—Meluer. Ramakryhmal
*Attorney, Agent, or Firm*—Robert E. Bushnell, Esq.

[57] ABSTRACT

A facsimile system having a proximity sensor for automatically converting an operating mode such as a telephone mode, a facsimile mode, a telephone/facsimile mode, and a telephone answer mode of a facsimile system. The facsimile system includes an key input unit for allowing a user to set the facsimile system in an AUTO mode; a proximity sensor for sensing whether the user is within a proximity zone of the facsimile system; and a controller for automatically changing an operation mode of the facsimile system from the telephone mode to the facsimile mode, when the facsimile system is set in the AUTO mode and when the user is not within the proximity zone of the facsimile system.

20 Claims, 4 Drawing Sheets

FACSIMILE SYSTEM HAVING A PROXIMITY SENSOR FOR AUTOMATICALLY SWITCHING RECEPTION MODE BASED UPON PRESENCE OR ABSENCE OF AN OPERATOR WITHIN A PREDETERMINED PROXIMITY ZONE AND METHOD FOR CONTROLLING THE SAME

CLAIM FOR PRIORITY

This application makes reference to, incorporates the same herein, and claims all benefits accruing under 35 U.S.C. §119 from an application for *Apparatus For Automatically Switching Receiving Mode Of Facsimile Machine Based On Sensing Of Audio Signal And Method For Controlling The Same* earlier filed in the Korean Industrial Property Office on Mar. 29, 1996, and there duly assigned Serial No. 9220/1996.

BACKGROUND OF THE INVENTION

1. Technical Field

The present invention relates to a facsimile system having a proximity sensor incorporated therein, and more particularly, relates to a process for automatically changing an operational mode of the facsimile system between a telephone mode and a facsimile mode, in response to a determination of whether a user is within a proximity zone of the facsimile system.

2. Related Art

Generally, a facsimile system having facsimile and telephone functions as disclosed, for example, in U.S. Pat. No. 4,901,343 for *Data Communication Apparatus* issued to Yamaguchi, U.S. Pat. No. 4,908,851 for *Facsimile Apparatus Operable In Facsimile Or Conversation Mode* issued to Kotani et al., U.S. Pat. No. 5,065,427 for *Fax/Data Call Receiving System And Method* issued to Godbole, U.S. Pat. No. 5,255,311 for *Data Communication Apparatus* issued to Yoshida, U.S. Pat. No. 5,260,991 for *Facsimile Apparatus* issued to Ikegaya, U.S. Pat. No. 5,323,451 for *Facsimile Device And Automatic Receiving Method* issued to Yatsunami, U.S. Pat. No. 5,448,378 for *Data Transmitting Apparatus And Method For Executing Both Facsimile Communication And Data Communication Without Suspending A Communication Line* issued to Matsumoto, U.S. Pat. No. 5,428,673 for *Data Communication Apparatus Having The Function Of Automatically Switching Data Communication And Telephone Communication* issued to Nakagawa, and U.S. Pat. No. 5,487,105 for *Facsimile Apparatus Operable In Facsimile Or Telephone Mode* issued to Sakai, is well known in the communication art for selectively operating either in a facsimile mode or in a telephone mode in dependence upon the type of signal sent from an originating side.

Other facsimile systems as disclosed, for example, in U.S. Pat. No. 5,086,455 for *Facsimile Arrangement Having Automatic Answering Telephone Set And Facsimile Set And Switching Process Therefor* issued to Satomi et al., U.S. Pat. No. 5,131,026 for *Facsimile System Having Auto-Answering Function* issued to Park, and U.S. Pat. No. 5,333,179 for *Facsimile Apparatus With Automatic Answering Telephone Function* issued to Yamamoto et al., are constructed with an automatic telephone answering device for recording a voice message from a calling subscriber when a user is not in the vicinity of the facsimile system to answer an incoming call. In such a system, the facsimile machine and the telephone answering machine must be set manually by the owner in an automatic voice answer mode in order to receive both fax and voice messages when the owner is absent. When the facsimile system is set in the automatic voice answer mode, and a call comes in, the telephone answering machine answers and plays the recorded announcement. If the call is from a person, the calling subscriber can leave a message following the normal instructional procedure for the answering machine. If the call is from another facsimile system however, the facsimile system switches over to a facsimile mode for automatically receiving the document. In this arrangement, if the user neglects or fails to manually set the facsimile system and the telephone answering device in this operating mode however, the facsimile system and the telephone have difficulty in timely performing telephone and image data reception functions. Hence, the facsimile system can only selectively receive the caller's voice or data message according to either a telephone mode or a facsimile mode.

In order to facilitate the image data reception and automatic answer functions from a remote distance, a facsimile system equipped with a telephone has recently been constructed such as disclosed in U.S. Pat. No. 5,189,693 for *Remote Control Facsimile Apparatus With Remotely Set Operation Mode* issued to Nakajima, and U.S. Pat. No. 5,216,706 for *Communication Apparatus Having Remote Control Operation Mode* issued to Nakajima, to incorporate a remote control operational mode in which respective image data reception and automatic answer functions can be controlled based on a predetermined remote control code transmitted from a remote telephone terminal. Using this construction however, the user must either memorize the remote control code or carry a wallet-sized card containing such remote control code in order to remotely control the functions of the facsimile system. I have found however, that even if the user carries the card containing such a remote control code, there may still be other problems inherently associated with the remote mode conversion operation such as, for example, entry of an incorrect code when the user fails to enter the correct remote control code. Accordingly, further operational mode improvement for the convenience of the user may be contemplated.

SUMMARY OF THE INVENTION

It is therefore an object of the present invention to provide an improved facsimile system and process for operation of the system.

It is also an object to provide a facsimile system having a proximity sensor incorporated therein and process for changing an operational mode of the facsimile system between a telephone mode and a facsimile mode to efficiently respond to an incoming call regardless of whether the incoming call is from a remote telephone or a remote facsimile system.

It is further an object to provide a facsimile system having a proximity sensor incorporated therein and process for changing an operational mode of the facsimile system between a telephone mode and a facsimile mode in response to a determination of whether a user is within a proximity zone of the facsimile system.

In accordance with one aspect of the present invention, a facsimile system having a telephone handset operable in one of a telephone mode and a facsimile mode includes a key input having a plurality of operation keys for permitting a user to set the facsimile system at an installation maintained by the user, in an automatic switch mode; a proximity sensor for sensing whether the user is within a proximity zone of the installation; and a controller for automatically changing an operation mode of the facsimile system from the telephone mode to the facsimile mode, when the facsimile system is set in the automatic switch mode and when the user is not within the proximity zone of the facsimile system. Proximity sensor is constructed of a microphone for detecting a level of ambient sound external to the facsimile system to produce an electric signal; a band-pass filter for filtering the electric signal to produce a filtered signal; an amplifier for amplifying the filtered signal to produce an amplified signal; and an audio signal detector for determining whether said user is within the proximity zone of the facsimile system based upon reception of the amplified signal. The proximity sensor may alternatively be constructed of either an infrared sensor for sensing whether body heat is present within the proximity zone or a motion sensor for sensing whether motion is present within the proximity zone of the facsimile system.

In accordance with another aspect, the present invention provides a method for automatically converting an operation mode of a facsimile system having a key input unit with an automatic mode key that is operable in one of a telephone mode, a facsimile mode, a telephone/facsimile mode, and a telephone answer mode. Such method includes the steps of: checking whether the automatic mode key has been input for setting the facsimile system at an installation maintained by a user, in an automatic switch mode; after the automatic mode key has been input for a predetermined duration, determining whether the user is within a proximity zone of the installation; when the user is within the proximity zone of the installation, maintaining the operation mode of said facsimile system in any one of the telephone mode, the facsimile mode, the telephone/facsimile mode, and the telephone answer mode previously set by the user; and alternatively, when the user is not within the proximity zone of the installation, automatically changing the operation mode of said facsimile system from any one of the telephone mode, the facsimile mode, and the telephone/facsimile mode into the telephone answer mode.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
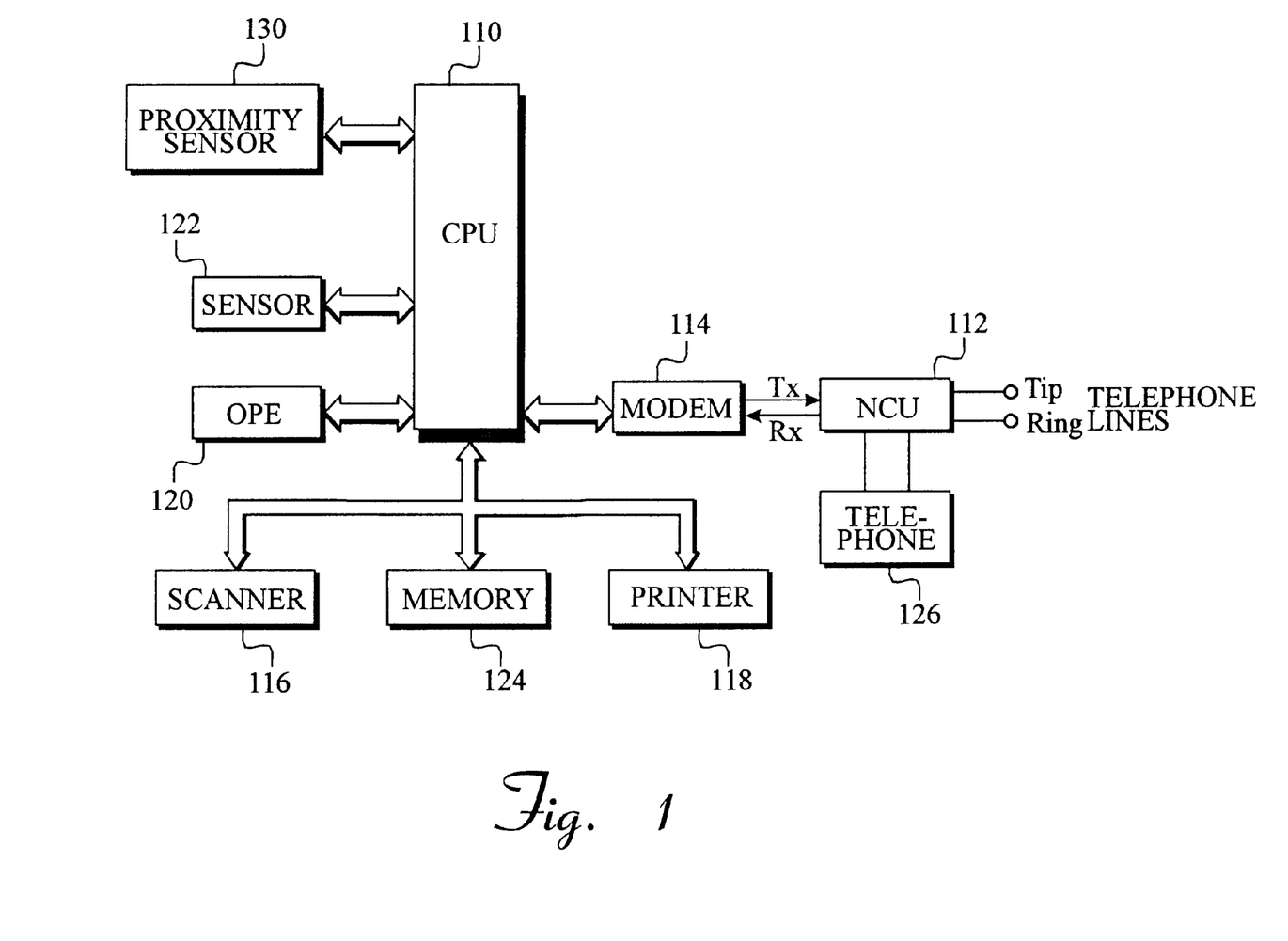
FIG. 1 is a block diagram of a facsimile system having a proximity sensor as constructed according to the principles of the present invention.

Referring now to the drawings and particularly to FIG. 1, which illustrates a facsimile system having a proximity sensor 130 constructed according to the principles of the present invention. The facsimile system includes a central processing unit (CPU) 110 for controlling operations of the facsimile system, a network control unit (NCU) 112 connected to a tip and ring terminal of standard telephone lines of a public switched telephone network (PSTN), a modem 114, scanner 116, a printer 118, an operational panel OPE 120, a sensor 122, a memory 124, a telephone 126 having a speaker and a microphone connected in parallel to the NCU 112, and a proximity sensor 130 which is operable in response to inputs of the OPE 120 for determining whether a user is within a proximity zone of the facsimile system. Such a determination is made either from an ambient noise level external to the facsimile system or from infrared radiation from a human body within the proximity zone of the facsimile system.

The memory 124 includes a program memory such as a ROM (not shown) which stores programs for the CPU 110 to control the general operation of the facsimile system for transmission or reception of image data from another communication system such as a telephone or a remote facsimile system, a data memory such as a RAM (not shown) which temporarily stores a variety of items of information. The operational panel (OPE) 120 includes a key input unit comprising a plurality of alpha-numeric keys and function keys that are independently operable by manual depression to provide key data to the CPU 10 to dial a telephone number of a counterpart communication system, and a display unit in a form of a liquid crystal display (LCD) for continuously providing a visual display of data indicating various modes of operations of the facsimile system. The key input unit has a number of operation mode selection keys for permitting a user to select an appropriate reception mode of the facsimile system including an automatic switch mode key for allowing the user to set the facsimile system in an automatic ("AUTO") mode and activate operation of the proximity sensor 130 for determining whether a user is within a proximity zone of the facsimile system and for automatically changing an operational mode of the facsimile system to appropriately respond to an incoming call. The sensor 122 senses whether a document is input into the facsimile system, or whether copy paper is stored and available for use, and generates an indicative signal to the CPU 110. The scanner 116 transports and scans an image of the input document and then generates image data corresponding to the scanned image. The image data output from the scanner 116 is then processed for either transmission via a telephone line or copy during the copy mode under control of the CPU 110. The printer 118 prints the processed image data received from the CPU 110 on a printable medium such as individual cut sheets of papers during the reception mode and the copy mode under the control of the CPU 110. The modem 114 modulates the processed image data output from the CPU 110 into a modulated image signal for transmission, and duplicates the image signal input to the CPU 110 during the reception mode under the control of the CPU 110. The NCU 112 is connected with a tip and ring terminals of the standard telephone lines to form transmission and reception paths for the modem 114 under the control of the CPU 110. The telephone 126 having a speaker and a microphone is connected in parallel to the NCU 112 to allow voice communication under the control of the CPU 110.

Figure 2:
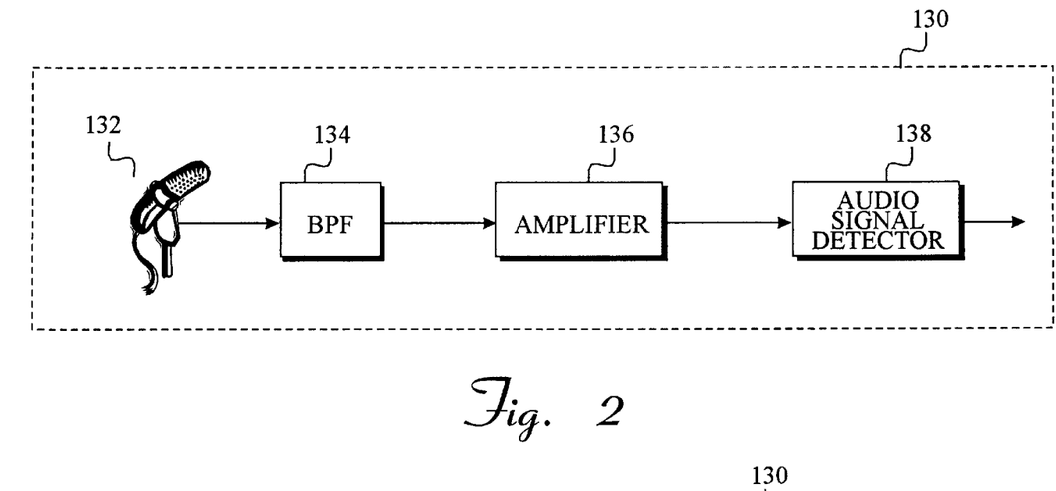
FIG. 2 is a detailed circuit diagram of the proximity sensor constructed according to a first embodiment of the present invention.

Turning now to FIG. 2 which illustrates a proximity sensor 130 serving as an ambient sound detector constructed according to the principles of the present invention. Such a proximity sensor 130 is activated after an automatic switch mode key from the OPE 120 of the facsimile system has been set by the user for a predetermined duration in order to prevent false request of the switching of the operation mode of the facsimile system while the user is located at the facsimile system to set the operation mode of such a facsimile system. As shown in FIG. 2, proximity sensor 130 includes a microphone 132, a band-pass filter (BPF) 134, an amplifier 136 and an audio signal detector 138. The microphone 132 detects a level of ambient noise or audible sound external to the facsimile system to produce an electric signal. The BPF 134 then filters the electric signal from the microphone 132. The microphone 132 may be configured to respond only to audio-frequency signal generated from the user who is in the proximity of the facsimile system. If the microphone 132 is configured to respond only to audio-frequency signal, then the BPF 134 having an audio-frequency bandwidth is implemented to pass only an audio-frequency component of the electric signal output from the microphone 132 while preventing noise having a frequency beyond the audio-frequency band from passing through the filter. The amplifier 136 then amplifies an output filtered signal passed through the BPF 134 to produce an amplified signal. The audio signal detector 138 receives an amplified signal from the amplifier 136 in order to determine whether the user is within a proximity zone of the facsimile system. It is noted here that the proximity zone of the facsimile system is defined by a level of sensitivity of the microphone 132 that is available in the art.

Audio signal detector 138 may be constructed by a comparator or a multi-vibrator. If the audio signal detector 138 is constructed by a comparator, the amplified signal is compared with a reference noise level to determine whether the user is within a proximity zone of the facsimile system in order to respond to an incoming call whether such an incoming call is from a remote telephone or a remote facsimile system. That is, if the ambient noise level is determined as lower than the reference noise level during a predetermined time period, no output sensed signal is produced from the audio signal detector 138, and as a result, no change in an operation mode of the facsimile system is required. However, if the ambient noise level is determined as higher than the reference noise level during the predetermined time period, the audio signal detector 138 generates an output sensed signal to the CPU 110 that indicates the user is validly within a proximity zone of the facsimile system. Based upon this information, the CPU 110 automatically changes an operational mode of the facsimile system to respond to an incoming call. Alternatively, if the audio signal detector 138 is constructed by a multi-vibrator, then no pulse is generated when there is no signal output from the amplifier 136. When there is an amplified signal output from the amplifier 136, however, output pulse is generated after a predetermined time period to ensure that the user is validly present within the proximity zone of the facsimile system in order to convert a current operation mode of the facsimile system into a designated operation mode such as a facsimile mode.

Figure 3:
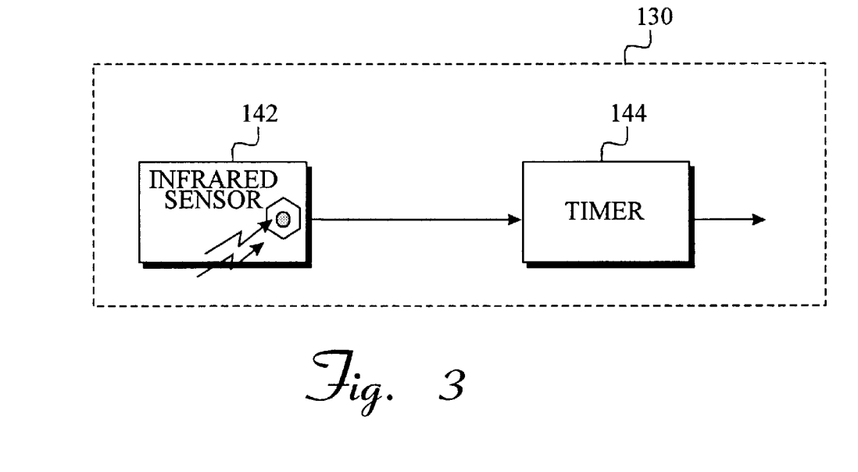
FIG. 3 is a detailed circuit diagram of the proximity sensor constructed according to a second embodiment of the present invention.

FIG. 3 illustrates a proximity sensor 130 as constructed by pyroelectric infrared (IR) type of sensors 142 according to another embodiment of the present invention. IR sensors 142 are used to sense infrared radiation from a human body to determine whether the user is within a proximity zone of the facsimile system. Commercially available infrared sensors may be used to sense the presence of the user not only based upon his or her body heat, but also based upon motion. Consequently, there will be time when the infrared sensors will falsely sense the presence of an unintended person who happens to be in the proximity zone for a short time. Accordingly, to avoid inappropriate action when someone enters the proximity zone only temporarily, a timer 144 is included to require the infrared sensors to maintain an "on" or "off" state for a predetermined time period before the infrared sensors 142 generate an output sensed signal that indicates whether the user is validly present or absent within the proximity zone of the facsimile system. When commercially available sensors are used in this embodiment, the proximity zone is readily available.

Figure 4:
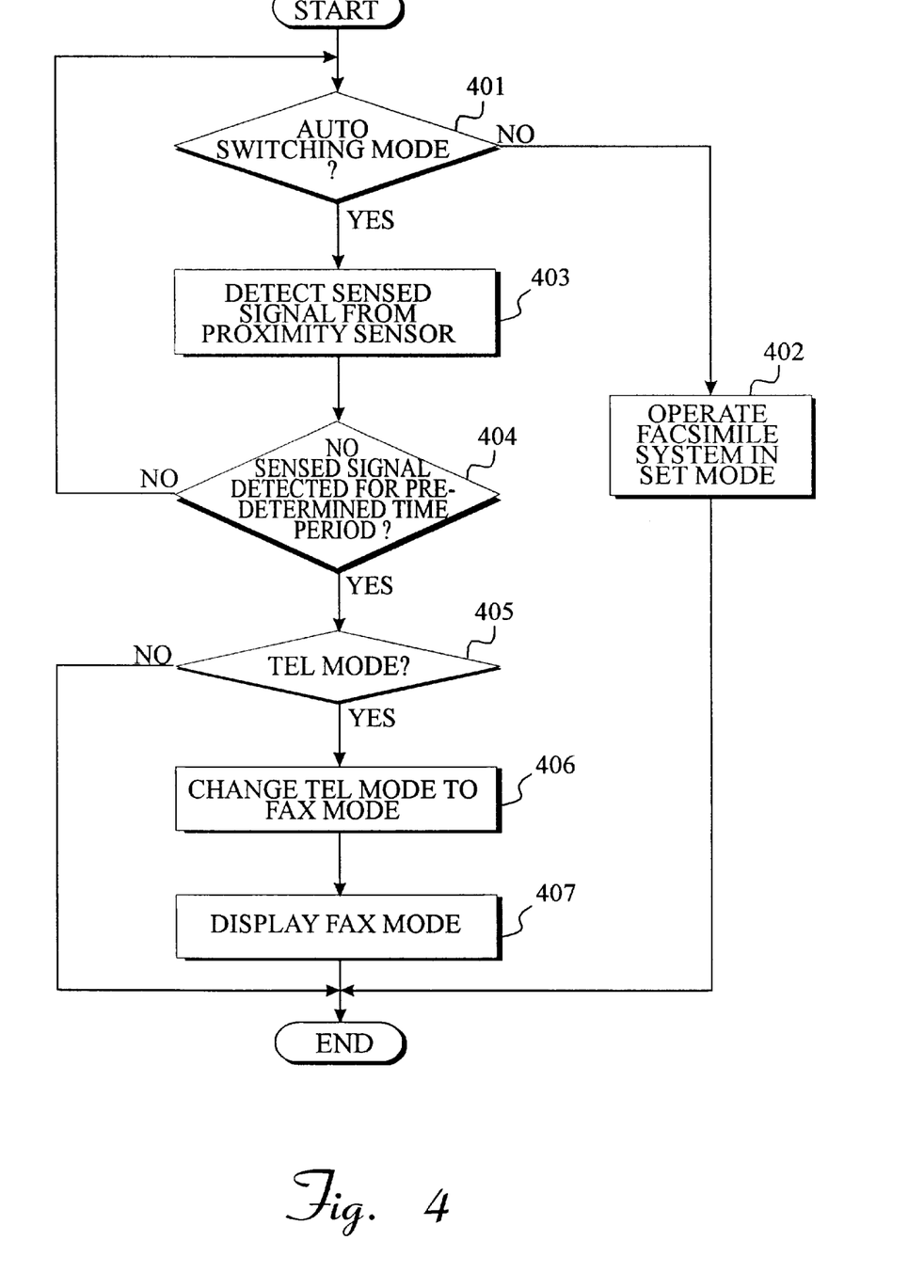
FIG. 4 is a flow chart of a control procedure of automatically switching a reception mode of the facsimile system according to one embodiment of the present invention.

Turning now to FIG. 4 which illustrates a process of automatically switching an operational mode of a facsimile system having a proximity sensor 130 constructed according to a preferred embodiment of the present invention. First, the CPU 110 determines whether the facsimile system is set in an automatic switching mode by the user by way of an automatic mode key input from the OPE 120 at step 401. If the facsimile system is not set in the automatic switching mode, the CPU 110 operates the facsimile system in a current operation mode previously set by the user at step 402. For example, where the current operation mode set by the user is a telephone mode, the CPU 110 operates the facsimile system in the telephone mode. Likewise, where the current operation mode is set in a facsimile mode, the CPU 110 operates the facsimile system in the facsimile mode.

However, when the facsimile system is set in the automatic switching mode at step 401, the CPU 110 detects an output sensed signal from the proximity sensor 130 at step 403. When there is an output sensed signal detected from the proximity sensor 130 for a predetermined time period at step 404, the CPU 110 acknowledges that there is a presence of the user within a proximity zone of the facsimile system and returns to step 401. When there is no sensed signal detected from the proximity sensor 130 for a predetermined time period, however, the CPU 110 acknowledges that there is no presence of the user within a proximity zone of the facsimile system and proceeds to determine whether the current operation mode of the facsimile system is a telephone mode at step 405. Where the current operation mode is not the telephone mode, the CPU 110 terminates the control procedure. However, where the current operation mode is the telephone mode, the CPU 110 controls the automatic changing of the telephone mode to a facsimile mode at step 106. At step 107, the CPU 110 then controls the visual display of the changed mode condition on the display unit of the OPE 120.

Figure 5:
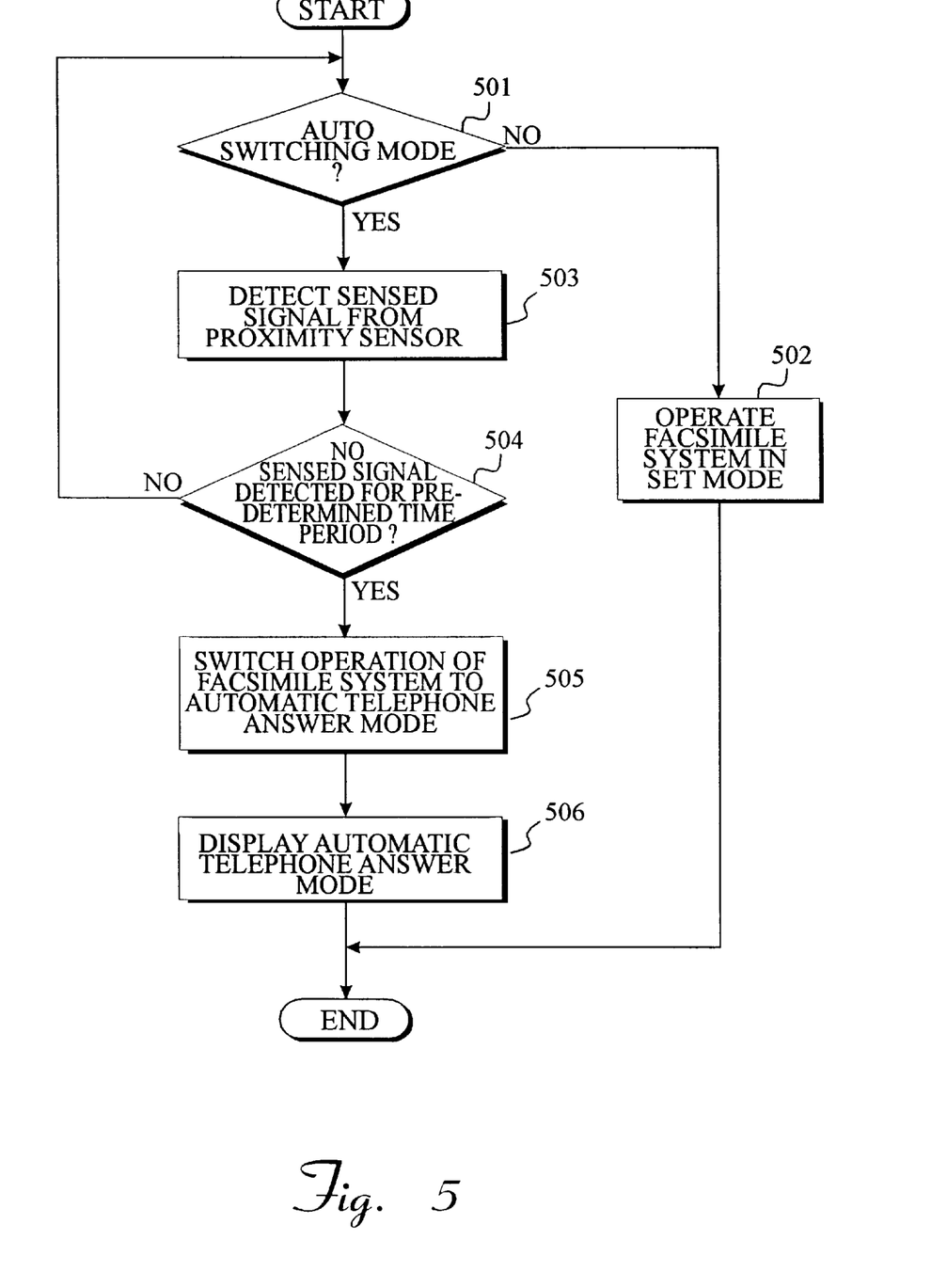
FIG. 5 is a flowchart of a control procedure of automatically switching a reception mode of the facsimile system according to another embodiment of the present invention.

Refer now to FIG. 5 which illustrates a process of automatically switching an operational mode of a facsimile system having a proximity sensor 130 constructed according to another embodiment of the present invention. In this embodiment, the facsimile system as contemplated has a number of basic modes of reception such as a facsimile mode which sets the facsimile system to treat all incoming calls as fax transmissions and to ignore the telephone calls, a telephone mode which sets the facsimile system to treat all incoming calls from either a telephone or fax as telephone calls and ring every time until the user answers the incoming calls first, an automatic TEL/FAX mode which sets the facsimile system to check all incoming calls to see if they are from a fax or telephone. If the call is from another fax, the facsimile system receives the document without ringing. If the call is from a telephone, the facsimile system rings to alert the user to pick up the handset and to answer the call. An automatic telephone answer mode is further included to receive all fax transmissions as well as telephone messages.

That is, when a call comes in, the telephone answering machine answers and plays the recorded announcement. If the call is from a person, the caller can leave a voice message following the normal procedure for the answering machine. If the call is from a remote facsimile system however, the facsimile system automatically switches over to the facsimile mode after a predetermined time period in order to receive the document in a timely fashion.

The proximity sensor 130 is intended primarily for the facsimile system to automatically switch an operating mode to an automatic telephone answer mode, when the user fails to manually set the facsimile system in such an operating mode in case the facsimile system is left unattended. The automatic operational mode switching according to the present invention is validated based upon the presence or absence of the user within a proximity zone of the facsimile system.

As shown in FIG. 5, the CPU 110 determines whether the facsimile system is set in an automatic switching mode by the user by way of an automatic mode key input from the OPE 120 at step 501. If the facsimile system is not set in the automatic switching mode, the CPU 110 operates the facsimile system in a current operation mode previously set by the user at step 502. However, when the facsimile system is set in the automatic switching mode at step 401, the CPU 110 detects an output sensed signal from the proximity sensor 130 at step 503. When there is an output sensed signal detected from the proximity sensor 130 for a predetermined time period at step 504, the CPU 110 acknowledges that there is a presence of the user within a proximity zone of the facsimile system and returns to step 501. When there is no sensed signal detected from the proximity sensor 130 for a predetermined time period, however, the CPU 110 acknowledges that there is no presence of the user within a proximity zone of the facsimile system, proceeds to automatically switch the operational mode of the facsimile system from any one of the operational modes previously set by the user such as the telephone mode, the facsimile mode, and the automatic TEL/FAX mode into an automatic telephone answer mode at step 505, and displays the same on the display unit of OPE 120 at step 506. In the event that the operational mode of the facsimile system was manually set in the automatic telephone answer mode, there is no need to switch the facsimile system into the same mode of operation. However, if the operational mode of the facsimile system was manually set in any one of the telephone mode, the facsimile mode, and the automatic TEL/FAX mode, the CPU 110 will switch the operational mode of the facsimile system into an automatic telephone answer mode in order to effectively respond to all other incoming call regardless of whether such an incoming call is from a remote telephone or from a remote facsimile system.

As described above, the present invention advantageously provides a facsimile system with means for changing the operational mode from a telephone mode to a facsimile mode or to an automatic telephone answer mode based upon a determination of whether the user is present or absent from the vicinity of the facsimile system, so that it is not necessary for the user to manually handle the facsimile machine in order to change the operational mode. Hence, there is achieved a great advantage and convenience in using the facsimile system, especially in time and expense.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A facsimile system operable in one of a telephone mode and a facsimile mode, comprising:

an operational panel for permitting setting of said facsimile system at an installation maintained by a user, in an automatic switch mode;

a proximity sensor for sensing whether said user is within a proximity zone of said installation; and a controller for automatically switching an operation mode of said facsimile system from said telephone mode to said facsimile mode, when said facsimile system is set in said automatic switch mode and when the user is not within said proximity zone of said installation;

wherein said proximity sensor is selected from a group consisting of an infrared sensor for sensing whether body heat is present within said proximity zone of said installation and a motion sensor for sensing whether motion is present within said proximity zone of said installation.

2. A facsimile system operable in one of a telephone mode and a facsimile mode, comprising:

an operational panel for permitting setting of said facsimile system at an installation maintained by a user, in an automatic switch mode;

a proximity sensor for sensing whether said user is within a proximity zone of said installation; and a controller for automatically switching an operation mode of said facsimile system from said telephone mode to said facsimile mode, when said facsimile system is set in said automatic switch mode and when the user is not within said proximity zone of said installation;

said proximity sensor further comprising:
a microphone for detecting a level of ambient sound external to said facsimile system to produce an electric signal;
a band-pass filter for filtering the electric signal from said microphone to produce a filtered signal;
an amplifier for amplifying the filtered signal to produce an amplified signal; and
an audio signal detector for determining whether said user is within said proximity zone of said installation based upon reception of said amplified signal.

3. The facsimile system of claim 2, further comprised of said audio signal detector corresponding to a comparator for comparing said amplified signal with a reference signal to determine whether said user is within said proximity zone of said installation.

4. The facsimile system of claim 2, further comprised of said audio signal detector corresponding to a multi-vibrator for producing a series of pulses when said user is within said proximity zone of said installation.

5. The facsimile system of claim 3, further comprised of said controller determining that said user is within said proximity zone of said installation, when said amplified signal exhibits an amplitude level greater than a reference level of said reference signal for a predetermined duration, and maintaining the operation mode of said facsimile system in any one of said telephone mode, said facsimile mode, and a telephone/facsimile mode previously set by said user.

6. The facsimile system of claim 3, further comprised of said controller determining that said user is not within said proximity zone of said installation, when said amplified signal exhibits an amplitude level lower than a reference level of said reference signal for a predetermined duration, and automatically switching the operation mode of said facsimile system from said telephone mode to said facsimile mode.

7. The facsimile system of claim 2, said proximity sensor further comprising an infrared sensor for sensing whether body heat is present within said proximity zone of said installation.

8. The facsimile system of claim 2, said proximity sensor further comprising a motion sensor for sensing whether motion is present within said proximity zone of said installation.

9. A facsimile system having a telephone handset and operable in one of a telephone mode, a facsimile mode, a telephone/facsimile mode, and a telephone answer mode, said facsimile system comprising:
  input means having at least an automatic mode key for enabling setting of said facsimile system at an installation maintained by a user, in an automatic switch mode;
  a proximity sensor for sensing whether said user is within a proximity zone of said installation; and
  controller means for automatically changing an operation mode of said facsimile system from any one of said telephone mode, said facsimile mode, and said telephone/facsimile mode into said telephone answer mode, when said facsimile system has been set in said automatic switch mode and when the user is not within said proximity zone of said installation;
  wherein said proximity sensor is selected from a group consisting of an infrared sensor for sensing whether body heat is present within said proximity zone of said installation and a motion sensor for sensing whether motion is present within said proximity zone of said installation.

10. A facsimile system having a telephone handset and operable in one of a telephone mode, a facsimile mode, a telephone/facsimile mode, and a telephone answer mode, said facsimile system comprising:
  input means having at least an automatic mode key for enabling setting of said facsimile system at an installation maintained by a user, in an automatic switch mode;
  a proximity sensor for sensing whether said user is within a proximity zone of said installation; and
  controller means for automatically changing an operation mode of said facsimile system from any one of said telephone mode, said facsimile mode, and said telephone/facsimile mode into said telephone answer mode, when said facsimile system has been set in said automatic switch mode and when the user is not within said proximity zone of said installation;
  said proximity sensor further comprising:
    a microphone for detecting a level of ambient sound external to the facsimile system to produce an electric signal;
    a band-pass filter for filtering the electric signal from said microphone to produce a filtered signal;
    an amplifier for amplifying the filtered signal to produce an amplified signal; and
    an audio signal detector for determining whether said user is within said proximity zone of said installation based upon reception of said amplified signal.

11. The facsimile system of claim 10, further comprised of said audio signal detector corresponding to a comparator for comparing said amplified signal with a reference signal to determine whether said user is within said proximity zone of said installation.

12. The facsimile system of claim 10, further comprised of said audio signal detector corresponding to a multivibrator for producing a series of pulses when said user is within said proximity zone of said installation.

13. The facsimile system of claim 11, further comprised of said controller means determining that said user is within said proximity zone of said installation, when said amplified signal exhibits an amplitude level greater than a reference level of said reference signal for a predetermined duration, and maintaining the operation mode of said facsimile system in any one of said telephone mode, said facsimile mode, and a telephone/facsimile mode previously set by said user.

14. The facsimile system of claim 11, further comprised of said controller means determining that said user is not within said proximity zone of said installation, when said amplified signal exhibits an amplitude level lower than a reference level of said reference signal for a predetermined duration, and automatically converting the operation mode of said facsimile system from any one of said telephone mode, said facsimile mode, and said telephone/facsimile mode into said telephone answer mode.

15. The facsimile system of claim 10, said proximity sensor further comprising an infrared sensor for sensing whether body heat is present within said proximity zone of said installation.

16. The facsimile system of claim 10, said proximity sensor further comprising a motion sensor for sensing whether motion is present within said proximity zone of said installation.

17. A method for automatically converting an operation mode of a facsimile system having a key input unit with an automatic mode key, said method comprising the steps of:
  checking whether said automatic mode key has been input for setting said facsimile system operable in one of a telephone mode, a facsimile mode, a telephone/facsimile mode, and a telephone answer mode, at an installation maintained by a user, in an automatic switch mode;
  after said automatic mode key has been input for a predetermined duration, determining whether said user is within a proximity zone of said installation;
  when said user is within said proximity zone of said installation, maintaining the operation mode of said facsimile system in any one of said telephone mode, said facsimile mode, said telephone/facsimile mode, and said telephone answer mode previously set by said user; and
  alternatively, when said user is not within said proximity zone of said installation, automatically changing the operation mode of said facsimile system from any one of said telephone mode, said facsimile mode, and said telephone/facsimile mode into said telephone answer mode;
  said user being determined within said proximity zone of said installation by a proximity sensor including:
    a microphone for detecting a level of ambient sound external to said installation to produce an electric signal;

a band-pass filter for filtering the electric signal from said microphone to produce a filtered signal;

an amplifier for amplifying the filtered signal to produce an amplified signal; and an audio signal detector for determining whether said user is within said proximity zone of said installation based upon reception of said amplified signal.

18. The method of claim 17, said proximity sensor further comprising an infrared sensor for sensing whether body heat is present within said proximity zone of said installation.

19. The method of claim 17, further determining that said user is within said proximity zone of said installation, when said amplified signal exhibits an amplitude level greater than a reference level of said reference signal for a predetermined duration, and maintaining the operation mode of said facsimile system in any one of said telephone mode, said facsimile mode, and said telephone/facsimile mode previously set by said user.

20. The method of claim 17, further determining that said user is not within said proximity zone of said installation, when said amplified signal exhibits an amplitude level lower than a reference level of said reference signal for a predetermined duration, and automatically converting the operation mode of said facsimile system from any one of said telephone mode, said facsimile mode, and said telephone/facsimile mode into said telephone answer mode.

* * * * *